US008739141B2

(12) United States Patent
Song et al.

(10) Patent No.: US 8,739,141 B2
(45) Date of Patent: May 27, 2014

(54) PARALLELIZING NON-COUNTABLE LOOPS WITH HARDWARE TRANSACTIONAL MEMORY

(75) Inventors: Yonghong Song, Palo Alto, CA (US); Spiros Kalogeropulos, Los Gatos, CA (US); Partha P. Tirumalai, Fremont, CA (US)

(73) Assignee: Oracle America, Inc., Redwood Shores, CA (US)

(*) Notice: Subject to any disclaimer, the term of this patent is extended or adjusted under 35 U.S.C. 154(b) by 1480 days.

(21) Appl. No.: 12/123,176

(22) Filed: May 19, 2008

(65) Prior Publication Data
US 2009/0288075 A1    Nov. 19, 2009

(51) Int. Cl.
G06F 9/45    (2006.01)

(52) U.S. Cl.
USPC ............................................. 717/150; 717/160

(58) Field of Classification Search
None
See application file for complete search history.

(56) References Cited

U.S. PATENT DOCUMENTS

| 4,825,360 | A | * | 4/1989 | Knight, Jr. .................... 718/106 |
| 5,361,354 | A | * | 11/1994 | Greyzck ......................... 717/160 |
| 5,446,862 | A | * | 8/1995 | Ohkami .......................... 711/100 |
| 6,286,104 | B1 | * | 9/2001 | Buhle et al. ...................... 726/4 |
| 6,539,541 | B1 | * | 3/2003 | Geva ............................. 717/150 |
| 6,651,246 | B1 | | 11/2003 | Archambault et al. |
| 6,654,954 | B1 | | 11/2003 | Hicks |
| 6,708,331 | B1 | * | 3/2004 | Schwartz ....................... 717/160 |
| 6,795,908 | B1 | * | 9/2004 | Lee et al. .......................... 712/4 |
| 6,880,045 | B2 | | 4/2005 | Pong et al. |
| 6,938,130 | B2 | | 8/2005 | Jacobson et al. |
| 7,395,531 | B2 | | 7/2008 | Eichenberger et al. |
| 7,426,724 | B2 | | 9/2008 | Kilgard et al. |
| 7,530,069 | B2 | | 5/2009 | Kawahara et al. |
| 7,543,282 | B2 | | 6/2009 | Chou |
| 7,818,729 | B1 | | 10/2010 | Plum et al. |
| 7,823,141 | B1 | * | 10/2010 | Gustafson et al. ............ 717/160 |
| 7,853,934 | B2 | | 12/2010 | Partamian |
| 8,024,714 | B2 | * | 9/2011 | Duffy et al. .................... 717/136 |
| 2002/0129228 | A1 | * | 9/2002 | Helder et al. .................. 712/234 |
| 2004/0049667 | A1 | | 3/2004 | McCormick et al. |
| 2006/0004996 | A1 | * | 1/2006 | Gonion .......................... 712/241 |

(Continued)

OTHER PUBLICATIONS

Lamport, "The Parallel Execution of DO Loops", 1974, Communication of the ACM, vol. 17, pp. 83-93.*

(Continued)

*Primary Examiner* — Jason Mitchell
(74) *Attorney, Agent, or Firm* — Rory D. Rankin; Meyertons, Hood, Kivlin, Kowart & Goetzel, P.C.

(57) ABSTRACT

A system and method for speculatively parallelizing non-countable loops in a multi-threaded application. A multi-core processor receives instructions for a multi-threaded application. The application may contain non-countable loops. Non-countable loops have an iteration count value that cannot be determined prior to the execution of the non-countable loop, a loop index value that cannot be non-speculatively determined prior to the execution of an iteration of the non-countable loop, and control that is not transferred out of the loop body by a code line in the loop body. The compiler replaces the non-countable loop with a parallelized loop pattern that uses outlined function calls defined in a parallelization library (PL) in order to speculatively execute iterations of the parallelized loop. The parallelized loop pattern is configured to squash and re-execute any speculative thread of the parallelized loop pattern that is signaled to have a transaction failure.

23 Claims, 4 Drawing Sheets

(56) References Cited

U.S. PATENT DOCUMENTS

| | | |
|---|---|---|
| 2006/0026575 A1 | 2/2006 | Cabillic et al. |
| 2006/0026580 A1 | 2/2006 | Cabillic et al. |
| 2007/0050762 A1 | 3/2007 | Chen et al. |
| 2008/0163185 A1 | 7/2008 | Goodman |
| 2009/0064119 A1* | 3/2009 | Archambault et al. ....... 717/160 |

OTHER PUBLICATIONS

Song, Y., et al; "Design and Implementation of a Compiler Framework for Helper Threading on Multi-Core Processors;" IEEE PACT 2005, (Sep. 2005); pp. 99-109.

Damron, P., et al; "Hybrid Transactional Memory"; ASPLOS XII; San Jose, CA (2006); http://www.princeton.edu/~asplos06/tprogram.html.

Su, E., et al; "Compiler Support of the Workqueuing Execution Model for Intel SMP Architectures"; Fourth European Workshop on OpenMP (EWOMP), (2002).

Zhong, H., et al; "Uncovering Hidden Loop Level Parallelism in Sequential Applications"; In Proc. of the 14th International Symposium on High-Performance Computer Architecture; (2008).

"Design and Evaluation of Dynamic Optimizations for a Java Just-in-Time Compiler", Suganuma, et al., Jul. 2005, pp. 732-785, http://delivery.acm.org/10.1145/1080000/1075386/p732-suganuma.pdf.

"Compiler Optimization of Embedded Applications for an Adaptive SoC Architecture", Hardnett, et al., Oct. 2006, pp. 312-322, http://delivery.acm.org/10.1145/1180000/1176798/p312-hardnett.pdf.

"Dynamic Code Management: Improving Whole Program Code Locality in Managed Runtimes", Huang, et al., Jun. 2006, pp. 133-143, http://delivery.acm.org/10.1145/1140000/1134779/p133-huang.pdf.

"ACME: Adaptive Compilation Made Efficient", Cooper, et al., Jul. 2005, pp. 69-77, http://delivery.acm.org/10.1145/1070000/1065921/p69-cooper.pdf.

* cited by examiner

PARALLELIZING NON-COUNTABLE LOOPS WITH HARDWARE TRANSACTIONAL MEMORY

BACKGROUND OF THE INVENTION

1. Field of the Invention

This invention relates to computer systems, and more particularly, to automatically speculatively parallelization.

2. Description of the Relevant Art

The performance of computer systems is dependent on both hardware and software. As generating performance from hardware design becomes increasingly difficult, attention turns to new methods of software design. For example, regarding the hardware of a system, the geometric dimensions of devices and metal routes on each generation of semiconductor chips continue to decrease. This reduction leads to increases in cross capacitance effects on wires, parasitic inductance effects on wires, and electrostatic field effects within transistors, which increase the circuit noise effects on-chip and propagation delays. In addition, the number of nodes that may switch per clock cycle significantly increases as more devices are used in each new generation. This trend leads to an increase in power consumption with each new generation of processors. The operational frequency is limited by these noise and power effects, which may limit the performance of the hardware. However, the reduction in geometric dimensions on-chip also allows for larger caches and multiple cores to be placed on each processor in order to increase performance.

Attention turns to software as programmers can no longer rely on ever-faster hardware to hide inefficient code and as the need to generate performance from applications executed on multi-core chips increases. With multi-core chips and multi-threaded applications, it becomes more difficult to synchronize concurrent accesses to shared memory by multiple threads. This makes it more difficult to ensure that the right operations are taking place at the right time, without interference or disruption, at high performance. The net result is that applications written for multi-processing workloads are currently not achieving the theoretical peak performance of the system. The problem intensifies as processor manufacturers are designing multi-core chips beyond dual- or quad-core processors, such as designing 8-core processors capable of supporting 64 threads.

Locking mechanisms on shared memory is one aspect of software design that disallows peak performance of a system. In place of locking mechanisms, transactional memory improves performance by allowing, in one embodiment, a thread to complete read and write operations to shared memory without regard for operations of other threads. In alternative embodiments, a division of work may be a software process consisting of multiple threads or a transaction consisting of multiple processes. Taking a thread as an example, with transactional memory, each thread records each of its read and write operations in a log. In one embodiment, when an entire thread completes, validation may occur that checks other threads have not concurrently modified its accessed memory locations. In an alternative embodiment, validation may occur upon the completion of each memory access in order to verify other threads have not concurrently modified its accessed memory locations. Once successful validation occurs, the thread performs a commit operation. If validation is unsuccessful, the thread aborts, causing all of its prior operations to be rolled back. Then re-execution occurs until the thread succeeds.

Transactional memory permits increased concurrency by reducing lock contention. No thread is required to wait for access to a resource. Different threads can safely and simultaneously modify disjoint parts of a data structure that would normally be protected under the same lock. Multi-threaded application performance improves, but it can improve further with more parallelization of the application code. For example, exploiting parallelism among instructions in the application code may include recognizing parallelism among iterations of a loop. In one embodiment, each iteration of a loop may overlap in execution with other iterations of the loop. One reason may be due to each iteration is independent of other iterations. Therefore, the iterations of the loop may be executed in parallel.

Generally speaking, there are two types of loops: countable and non-countable. Countable loops have an iteration count that can be determined by a compiler before the loop is executed. The loop index does not change except during an increment or a decrement at the end of the loop body. There has been research performed concerning the use of transactional memory to aid in parallelizing countable loops, and thus, increase the performance of multi-threaded applications.

Non-countable loops do not have an iteration count that can be determined by a compiler before the loop is executed. Also the loop index may change in places other than an increment or a decrement at the end of the loop body, if such an increment or decrement exists at all. An example is a traditional link-list tracing loop. Due to their characteristics of an undetermined prior iteration count and a changing loop index, such parallelization may need to be speculative. This is a much more difficult task than parallelizing countable loops with hardware transactional memory support. However, in order to further increase system performance, non-countable loops should be parallelized as well.

In view of the above, efficient method and mechanisms for speculatively parallelizing non-countable loops with a compiler framework are desired.

SUMMARY OF THE INVENTION

Systems and methods for automatically speculatively parallelizing certain kinds of non-countable loops in a multi-threaded application are contemplated. In one embodiment, a method comprises examining program instructions of a multi-threaded application in order to identify a non-countable loop pattern. In addition to having a parallel construct, such as a "for" or a "while" loop, a non-countable loop pattern has an iteration count value that can not be determined prior to the execution of the loop, and its loop index value can not be non-speculatively determined prior to the execution of an iteration of the loop.

If a non-countable loop pattern is found, it is replaced with a parallelized loop pattern. The compiler also generates two outlined functions based on the original non-countable loop pattern. The outlined function calls are used for computing a loop index value for a subsequent iteration, an exit condition of the loop, any break condition in the loop body, and execution of the loop body. The method also comprises squashing and re-executing any speculative thread of the parallelized loop pattern signaled to have a transaction failure.

In various embodiments, a back-end compiler comprises an optimizer configured to examine program instructions of a multi-threaded application to identify a non-countable loop pattern, replace the non-countable loop pattern with a parallelized loop pattern, and place code in the parallelized loop pattern to squash and re-execute any speculative thread of the parallelized loop pattern signaled to have a transaction failure.

Figure 1:
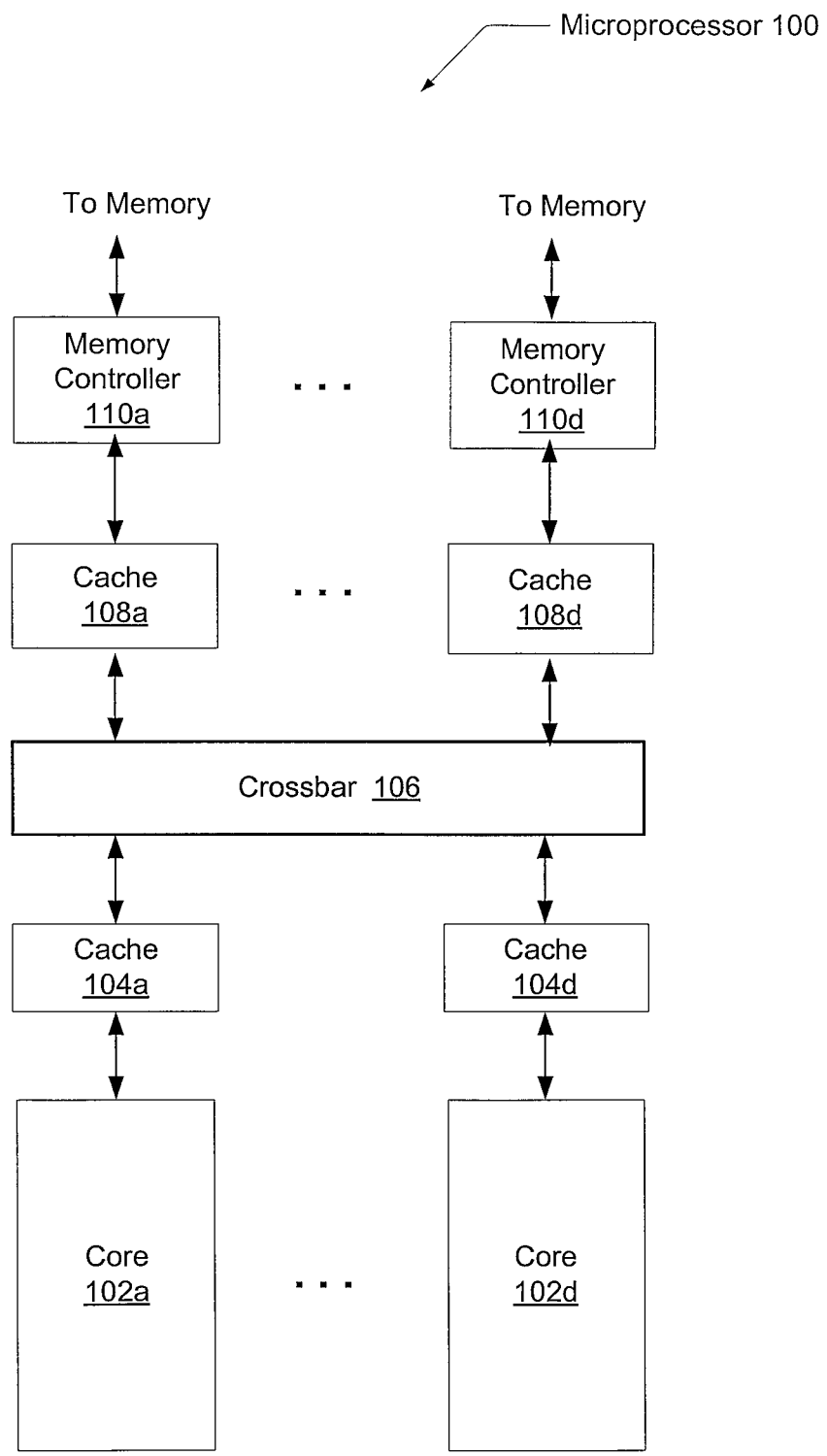
FIG. 1 is a generalized block diagram illustrating one embodiment of a multi-core microprocessor.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Referring to FIG. 1, one embodiment of a multi-core microprocessor 100 is shown. Microprocessor 100 may have multiple cores 102a-102d. As used herein, elements referred to by a reference numeral followed by a letter may be collectively referred to by the numeral alone. For example, cores 102a-102d may be collectively referred to as cores 102. Each core 102 may include a superscalar microarchitecture with one or more multi-stage pipelines. Also, each core 102 may be designed to execute multiple strands, or threads. For example, a multi-thread software application may have each of its software threads scheduled to be executed on a pipeline within a core 102. Each core 102 may comprise a first-level cache or in other embodiments, the first-level cache 104 may be outside the core 102.

A crossbar 106 may be used to connect each core 102 and first-level cache 104 to shared resources such as second-level caches 108 and lower-level memory via memory controllers 110. Interfaces between crossbar 106 and the different levels of caches 104 and 108 may comprise any suitable technology. In other embodiments, other levels of caches may be present between cache 108 and memory controller 110. Also, an I/O bus adapter, not shown, may be coupled to crossbar 106 to provide an interface for I/O devices to caches 104 and 108 and cores 102. In another embodiment, an I/O interface may be implemented in memory controller 110. Memory controllers 210 may be coupled to lower-level memory, which may include other levels of cache on the die outside the microprocessor, dynamic random access memory (DRAM), dual in-line memory modules (dimms) in order to bank the DRAM, a hard disk, or a combination of these alternatives. Also, in other embodiments, there may only be a single memory controller 110 on microprocessor 100.

A multi-thread software application may be written by a designer to be executed on a multi-core processor, such as the one in FIG. 1, or on a multi-processor chip. The multi-thread program needs to be compiled prior to execution on a system such as microprocessor 100.

A compiler is a set of programs for translating source code, such as a multi-thread software program, into another computer language, or target code. The source code may be software applications written by a designer in a high-level language such as C, C++, Fortran, or other. The target code may be machine code or bytecode depending on the type of compilation being performed. Machine code is a general term that refers to patterns of bits with different patterns corresponding to different commands, or instructions, to the machine, or processor. Bytecode is a general term for different forms of instruction sets designed for efficient execution by a software interpreter as well as being suitable for further compilation into machine code. Bytecode may be portable among different computer architectures. The bytecode may then be interpreted, or run, on a virtual machine. A software interpreter is a program designed to run other non-executable programs directly without a compiler.

Most modern compilers may be split into a number of relatively independent phases, or passes. Separate phases allow one or more phases to be later improved or replaced, and additional phases may later be inserted to permit additional optimizations. Although modern compilers have two or more phases, these phases are usually regarded as being part of the front-end or the back-end. There is not a hard boundary of responsibilities between these two phases. Generally speaking, the front-end performs syntactic and semantic processing and translates the source code to a lower-level of representation. This lower-level representation may be an IR or bytecode depending on the compiler implementation. Also optimizations may be performed on the IR. The independence provided by the IR of the source code from the machine code allows generic optimizations to be shared between versions of the compiler.

The back-end compiler takes the output from the front-end compiler, or the intermediate code representation, and performs more analysis, transformations, and optimizations for a particular hardware platform. Then it generates machine code for a particular processor and operating system (OS). Basic components of a back-end compiler may include a processor core selection unit for determining the number of available hardware threads and assigning software threads to the available hardware threads, a preprocessor for receiving the IR and dividing instructions into basic components, an optimizer for performing transformations and optimizations after analysis of the IR, and a code generator for conveying bit-wise machine code as an output. An advantage of splitting the front-end of a compiler from the back-end is front-ends for different languages may be combined with back-ends for different processors.

Both dynamic and static compilations are available. Dynamic compilation performs optimizations that may only be known at runtime, or during the actual execution of a program. Application programs compiled in this manner may initially execute slowly until most of the compilation and recompilation is completed. Then the application should execute quickly. Some optimizations that could be done at the initial compile time may be delayed until further compilation at runtime. However, at development time, dynamic compilation can recompile the code if this is found to be advantageous. Static compilation performs all optimizations prior to runtime. Intensive optimization may be performed prior to runtime. In contrast, dynamic compilation performs analysis at execution time, and thus it is limited to simple optimizations that can be performed without a large impact on the combined compile and execute time. Compared to dynamic compilation, static compilation requires a smaller start-up cost, smaller memory usage, and it permits automatic sharing of code by the OS between applications. Many more factors may be investigated while comparing the two different forms of compilation and the chosen compiler depends on the design situation.

Figure 2:
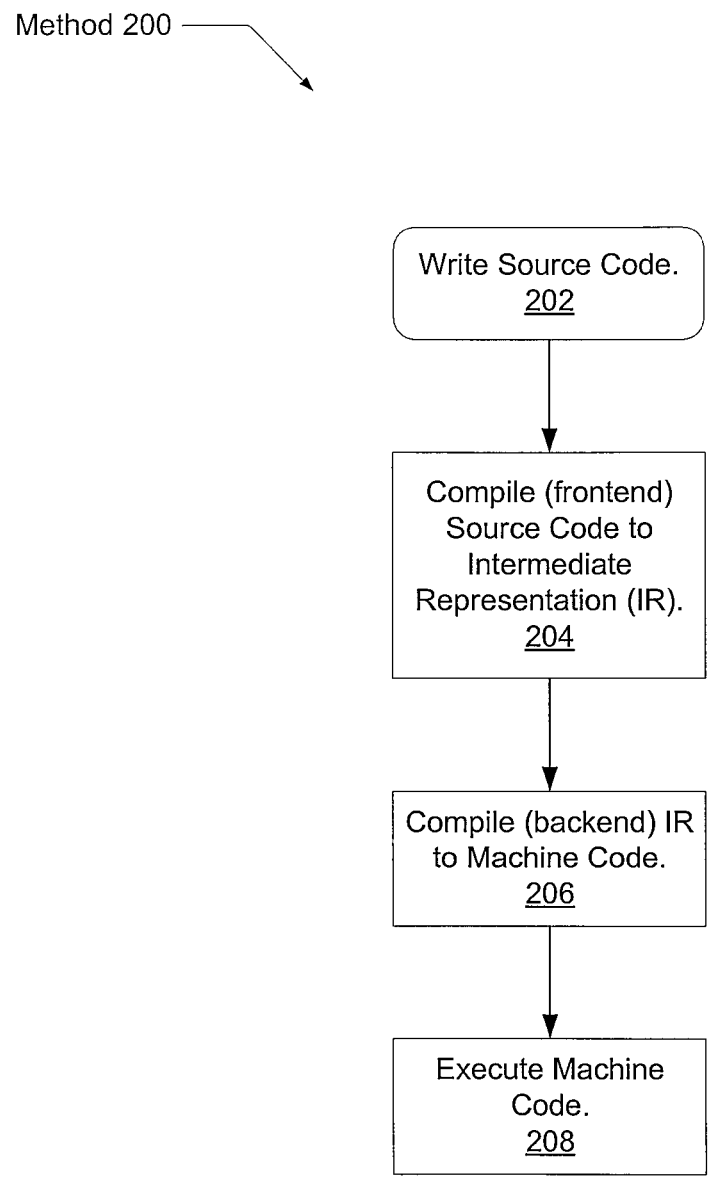
FIG. 2 is a flow diagram illustrating one embodiment of a static compiler method.

Referring to FIG. 2, one embodiment of a static compiler method 200 is shown. Software applications may be written by a designer in a high-level language such as C, C++, Fortran, or other in block 202. This source code may be stored on a computer readable medium. A command instruction, which may be entered at a prompt by a user, with any necessary options may be executed in order to compile the source code.

In block 204, the front-end compilation translates the source code to an IR. Syntactic and semantic processing as well as some optimizations are performed at this step. The translation to an IR instead of bytecode, in addition to no use of a virtual machine, allows the source code to be optimized for performance on a particular hardware platform, rather than to be optimized for portability across different computer architectures.

The back-end compilation in block 206 translates the IR to machine code. The back-end may perform more transformations and optimizations for a particular computer architecture and processor design. For example, a processor is designed to execute instructions of a particular instruction set architecture (ISA), but the processor may have one or more processor cores. The manner in which a software application is executed (block 208) in order to reach peak performance may differ greatly between a single-, dual-, or quad-core processor. Other designs may have eight cores. Regardless, the manner in which to compile the software application in order to achieve peak performance may need to vary between a single-core and a multi-core processor.

One optimization that may be performed at this step is loop unrolling. Loops with an iteration count that can be determined by a compiler before the loop is executed and has an unchanging loop index is referred to as a countable loop. Countable loops may have each loop iteration executed simultaneously. Although these iterations may be concurrently executed, on multi-core processors, execution may be halted due to overlapped accesses or potential overlapped accesses to a shared resource such as memory. Lock contention may be used to prevent potential overlapped accesses to shared memory, such as caches 104 and 108 and Memory in FIG. 1. However, it also reduces performance when cores are in a wait state until the lock is removed.

Transactional memory may be used to prevent halted execution. A checkpoint and commit instruction pair may be used to ensure two or more threads have not concurrently modified the same accessed memory location. For example, each executing thread may maintain a log, or a checkpoint record, that contains each of its read and write operations to memory. In one embodiment, validation may occur during a checkpoint instruction. In alternative embodiments, validation may occur upon completion of any memory access or during a commit instruction. If a memory conflict is found, the particular thread may roll back its operations to the last validated checkpoint, rather than from the start of the thread. In another embodiment, the thread may be aborted and rescheduled for execution at a later time. Upon completion of all of the thread's operations and validation of no memory conflict, an independent thread may execute a commit instruction and be permitted to store the architectural state of its operations.

The task of spawning and terminating threads, as well as scaling the number of threads according to the number of available processors or processor cores, may be performed by code referred to as a parallelization library (PL). The back-end compiler may expose parallel constructs such as a "for" or a "while" loop by replacing the code in the IR with method or function calls defined in a PL. These function calls may include a call for a main thread, or a Master thread. The main thread includes codes to communicate and synchronize with slave threads.

The PL will apply a scheduling policy, which is determined and passed in by the back-end compiler, to partition work among multiple threads. As one skilled in the art is aware, there are many different scheduling policies. The most common scheduling policy is called "static" scheduling, which tries to distribute original work evenly across all Slave threads.

Most automatic parallelization is implemented with a fork-join model. The Master thread forks a set of non-main threads, Slave threads, such that the work in a parallel loop will be shared among all Slave threads.

The following example gives a simplified view of back-end compiler code generation and interaction between the back-end compiler and the PL. Suppose a designer has written source code that contains the below code segment now in the IR,

```
for (i = 1; i <= n; i++) {            /* line 1 */
    a[i] = b[i] + foo (i);
}
```

The compiler may replace the above original code with the following:

```
/* Parameters to pass to parallelization library */   /* line 4 */
parameters.lower = 1;
parameters.upper = n;
parameters.step = 1;
parameters.outlined__func = __outlined__$func__;
/* pass in arguments for the outlined routine */
pass__in__argvs[0] = a;                                /* line 10 */
pass__in__argvs[1] = b;
__MasterFunc__ (&parameters, pass__in__argvs, ...)
```

The function call "_outlined_$func_" is the outlined function for the original loop. This function call is stored in the same object file as where the original loop is stored, and it may contain the following:

```
__outlined__$func__ (pass__in__argvs, lower, upper, ...)   /* line 13 */
    copy__in__a = pass__in__argvs[0];
    copy__in__b = pass__in__argvs[1];                       /* line 15 */
    for (private__i = lower; private__i <= upper; private__i++) {
        copy__in__a[private__i] = copy__in__b[private__i] + foo (private__i);
    }
```

The function call "_MasterFunc_" is defined in the parallelization library (PL). It will partition the original work among multiple Slave threads, and also handle synchronization between different threads.

The parallelization described above may be used in systems with transactional memory in order to perform speculative parallelization. However, some changes may need to occur to perform automatic speculative parallelization for systems with transactional memory. In order to assume certain hardware transaction support, first, a special load instruction in which the load operation does not participate in hardware transactional memory disambiguation. This special load instruction permits thread synchronization among speculative threads without causing a transaction failure. This special load instruction may replace existing load instructions by the back-end compiler swapping opcodes of the respective load instructions.

Second, the back-end compiler will pass to the PL whether or not the loop is parallelized speculatively. Third, the checkpoint and commit instructions should be emitted. Validation will be performed by each speculative thread. Fourth, if a speculative Slave thread fails its transaction, all current subsequent speculative Slave threads should be squashed and re-executed. This will be further explained below. Fifth, although the slave threads execute concurrently, the master thread and slave threads ensure in-order commit for all participant threads. Sixth, the writing of state information and results may only be performed for a slave thread when all of its logically previous speculative slave threads have completed their respective transactions without failure. This will be explained further below when validation is discussed.

Figure 3:
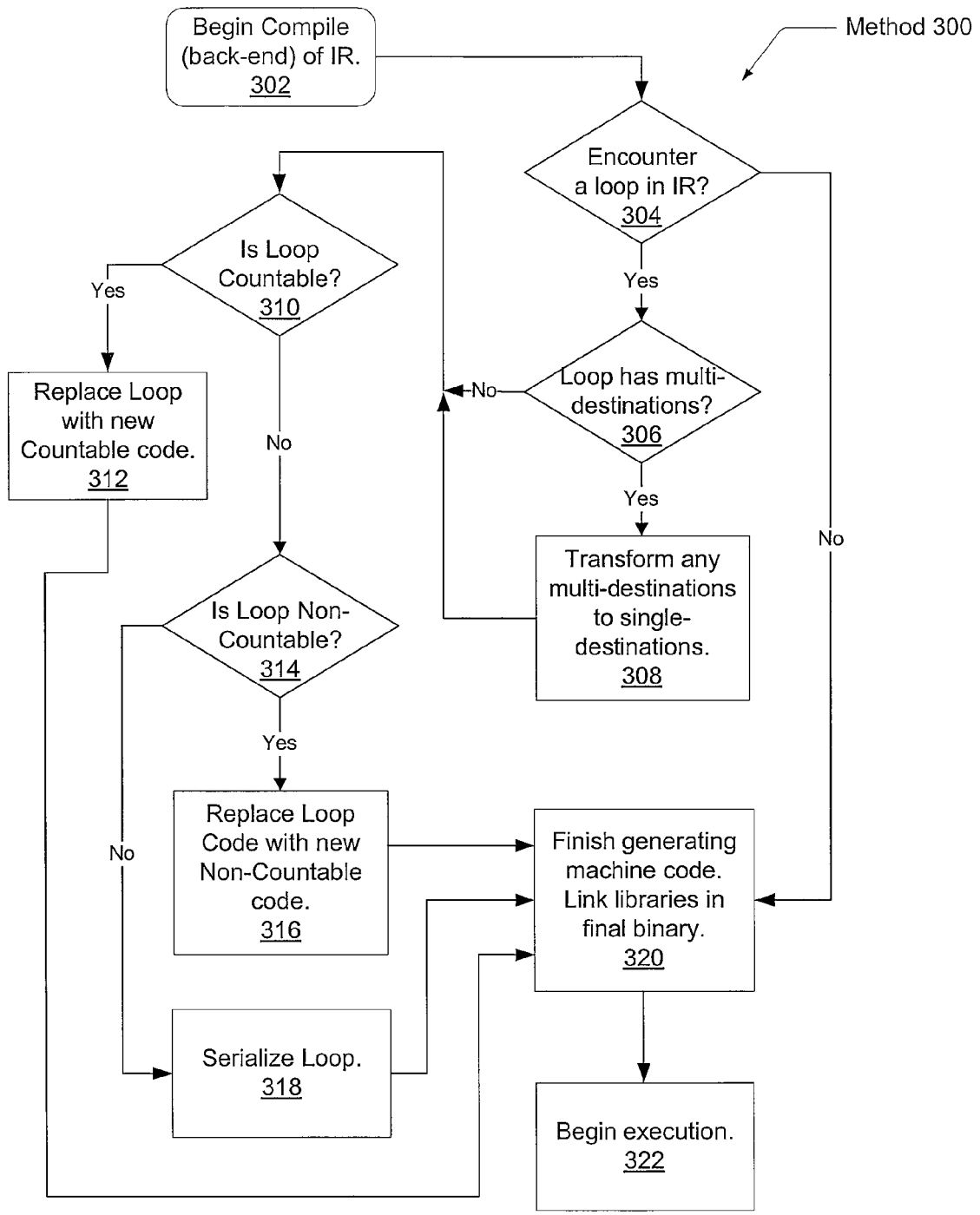
FIG. 3 is a flow diagram illustrating one embodiment of a method for automatic speculative parallelization of non-countable loops.

Turning now to FIG. 3, one embodiment of a method 300 for automatic speculative parallelization is shown. Method 300 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, source code has been translated and optimized by front-end compilation and the respective IR has been conveyed to a back-end compiler in block 302.

If parallel constructs, such as a "for" loop or a "while" loop, have been found in the IR, the loop is inspected for the single-entry and single-exit programming style (conditional block 304). It is widely believed a programming style is more easily understood if it has only a single entry point (at the top of its listing) and only one exit point at the bottom of its listing (or near, e.g., a return statement just before the closing "}" of a non-void C++ function). An example of such a style is provided in the following:

```
q = initial_q;                    /* line 19 */
p = initial_p;                    /* line 20 */
while (p) {
    do_work (p, q);
    p = p->next;
}
next0:                            /* line 25 */
    foo (0);
```

Above, the "initial_q" and "initial_p" are the initial values assigned to variables "q" and "p", respectively. The simple "while" exit condition using the index variable "p" is used as an example. Here, a simple exit condition may be the variable "p" being decremented in any fashion by the "p→next" function. Any other method may be used and the above code example is for illustrative purposes only. The "do_work" function performs work designed by the software programmer with "p" and "q" as the input parameters. Here, the "do_work" function must not alter the "p" value, however, it may have some other load and store instructions.

If a loop is found with multiple entries (conditional block 304), another method or algorithm may be needed to parallelize the loop, or the loop is executed in a serial manner. Following, control flows to block 314. However, method 300 is able to convert a loop with multiple destinations to a single destination. If a loop is found in the IR with a single-entry (conditional block 304), the loop is inspected for a multi-exit style, or if the loop has multiple destinations (conditional block 306). An example of a loop with multiple destinations is provided below:

```
while (p) {                       /* line 27 */
    if (p->data1) goto next1;
    if (p->data2) goto next2;
    p = p->next;                  /* line 30 */
}
next0:
    foo (0);
next1:
    foo (1);                      /* line 35 */
next2:
    foo (2);
```

Above, the functions "p→data1" and "p→data2" are used for illustrative purposes and may denote any relational operators and conditions. The above multi-destination loop has multiple possible destinations when the control is transferred out of the loop. In the above example, the possible destinations are labeled "next0", "next1" and "next2".

Method 300 is able to convert a multi-destination loop to a single-destination loop. Code replacement and code generation by the back-end compiler, using function calls defined in the PL, operate on single-destination loops. Given a multi-destination loop (conditional block 306), this loop is transformed to a single-destination loop in block 308.

In order to transform a loop, a set of branch instruction lines is placed outside the loop in order to transfer control to the proper destination in the code. A local variable inside the loop is used to record which branch will be taken when the control is about to transfer out of the loop body at runtime. The above multi-destination loop may be transferred to a single-destination loop as shown in the following:

```
local_branch_transfer_id = 0;                                   /* line 38 */
while (p) {
    if (p->data1) { local_branch_transfer_id = 1; break; }      /* line 40 */
    if (p->data2) { local_branch_transfer_id = 2; break; }
    p = p->next;
}
if (local_branch_transfer_id is equal to 1) goto next1;
if (local_branch_transfer_id is equal to 2) goto next2;         /* line 45 */
next0:
    foo (0);
next1:
    foo (1);
next2:                                                          /* line 50 */
    foo (2);
```

After the transformation to a single-destination loop (block 308) or after the back-end compiler determines the loop does not contain multi-destinations (conditional block 306), the loop is inspected to see if it meets the countable loop requirements (conditional block 310). As described before, loops with an iteration count that can be determined by a compiler before the loop is executed and has an unchanging loop index is a countable loop. Countable loops do not have cross-loop dependencies. If the loop is a countable loop (conditional block 310), such as the first example above containing the "for" loop, then the original code for the loop is replaced with new code in block 312. The new code may contain function calls found in the PL, such as the "_outlined_$func_" and "_MasterFunc_" described above.

If the loop is not a countable loop (conditional block 310), then the loop is inspected to see if it meets the non-countable loop requirements (conditional block 314). A single-entry, single-destination non-countable loop has the following basic pattern:

```
p = initial_p;                              /* line 52 */
while (exit_condition (p) is FALSE) {
    do_work (p);
    if (break_condition (p)) {              /* line 55 */
        break;
    }
    p = get_next (p);
}
```

Basically, the above pattern shows a pointer-chasing style loop. Currently, the style of loop is not parallelized by either traditional automatic parallelization or speculative automatic parallelization for countable loops. Program slicing during back-end compilation may be used to check whether a particular loop may be mapped to the above pattern. Again, above, the value "initial_p" is the initial value assigned to the loop index variable "p". For simplicity and illustrative purposes, in the above loop pattern example, the loop body has only one "break". However, it is possible in other embodiments of the invention to include multiple "break" statements. The "exit_condition" function will test whether the "while" loop should be exited. The "do_work" function, again, performs work designed by the software programmer with the index variable "p" as an input parameter. The "do_work" function does not alter the index variable "p". The "break_condition" function computes whether or not program control should break out of the "while" loop. The body of the if statement at line 55 above may include other statements, in addition to the break statement, which do not modify the value of the index variable "p". The "get_next" function tries to use the input parameter "p" to compute the updated "p" value.

In order for the above loop pattern to be qualified by the back-end compiler as being a type of non-countable loop that may be automatically speculatively parallelized, some qualifying conditions need to be met in addition to satisfying the above loop pattern. For example, first, it is possible that some load instructions in the functions "exit_condition" and "get_next" could be modified by the "do_work" function. If the compiler cannot prove such modifications do not occur, care must be taken at runtime to ensure that such a modification possibility exists in order to ensure correctness. Second, the "exit_condition" function must not contain store instructions in order that it does not modify the index variable "p" and the only modifications to memory are done by the "do_work" function. Third, the "do_work" function must not alter the index variable "p", however, this function may have some other load and store instructions.

Fourth, the "break_condition" function, similar to the "do_work" function, has the requirement of not altering the index variable "p". If the "break_condition" function always returns false (i.e., the control is never transferred out of the loop body in the middle of the loop body), and the back-end compiler can prove that all load instructions in the functions "exit_condition" and "get_next" are not modified by the "do_work" function, another method such as task queue parallelization may be implemented, see E. Su, Compiler Support of the Workqueuing Execution Model for Intel SMP Architectures, 4th European workshop on OpenMP (EWOMP), 2002. However, this work needs to be combined with speculative automatic parallelization for countable loops in order to achieve the parallelization goal. Fifth, the "get_next" function also must not contain store instructions in order that it does not modify the index variable "p" and the only modifications to memory are done by the "do_work" function.

If a single-entry and single-destination loop does not have the above pattern, or it has the above pattern, but does not meet the above requirements for a non-countable loop (conditional block 310), then the loop may not be parallelized (block 318). Rather, the loop may be compiled to be later executed in a serial manner.

If a single-entry and single-destination loop does have the above pattern and it does meet the above requirements for a non-countable loop (conditional block 314), then the loop is replaced with new code in block 316 that will perform automatic speculative parallelization. In one embodiment, the original non-countable loop code will be replaced by nested "while" loops in order to allow a Master thread to control waiting Slave threads. The main thread will execute the "while" loop, but without the work performed by the "do_work" function. The Main thread may prepare the "pass-in" argument for the "do_work" function for each Slave thread.

Afterwards, the Main thread may copy "pass-in" values of the index variable "p" in a per-Slave-thread data structure, followed by activating all the waiting Slave threads. Each Slave thread may then execute an outlined function, which is essentially the "do_work" function. All currently executing Slave threads except the first one perform speculatively. If a speculative Slave thread has a failing transaction, all subsequent Slave threads need to be squashed and re-executed, which is similar to the thread failure control of countable loop transactional parallelization.

Blocks 312, 316, and 318 all flow to block 320 in method 300. Here, the corresponding code style is translated to binary machine code and function calls defined in libraries, such as the PL, are included in the binary. Execution of the machine code follows in block 322.

An example of one embodiment of a replacement code algorithm that speculatively parallelizes a non-countable loop, as shown in block 316 and shown at code line 52 above, is given in the following:

```
p = initial_p;                                                  /* line 60 */
b = exit_condition (p);
while (b is FALSE) {                                            /* line 62 */
    iter_number = 0;
    p_lists[0:num_threads] = <empty>;
    p_ld_lists[0:num_threads] = <empty>;                        /* line 65 */
    while (b is FALSE && iter_number < num_threads) {           /* line 66 */
        p_lists[iter_number] = {value of p};
        /* The loads after the "do_work" in the last thread
         * need not be collected as they will not be
         * executed by any speculative Slave thread.            /* line 70 */
         * It is possible that the loads in "get_next" and
         * "exit_condition" functions may generate a memory
         * segmentation fault, which may not exist in the original
         * program. Here, we clone the "get_next" and "exit_condition"
         * functions with the new functions "get_next_clone"    /* line 75 */
         * and "exit_condition_clone". All loads in the new functions
         * "get_next_clone" and "exit_condition_clone"
         * will be non-faulting loads, which do not generate
         * any segmentation fault at runtime.
         * It is also possible to put the enclosing "while"     /* line 80 */
         * loop in a transaction region to catch a potential
         * memory fault. Transaction failure will cause
         * the "while" loop to be serialized for the
         * "num_threads" number of iterations.
```

```
                                                                    /* line 85 */
    */
    if (iter_number != (num_threads – 1)) {
        p = get_next_clone (p);
        b = exit_condition_clone (p);
        <add all loads and their contents in get_next and
        exit_condition to p_ld_lists[0:iter_number]>
    }                                                               /* line 90 */
    iter_number = iter_number + 1;
}                                                                   /* line 92 */
p_exit_cond = FALSE;
for (i = 0; i < iter_number; i++) {
    /* enable the speculative threads */                            /* line 95 */
    slave_start[i] = 1;
}
/* basically, wait for the done flag from the last slave thread. */
waiting until all slave threads finished;                           /* line 99 */
/* If exit condition is true, done the work.                        /* line 100 */
 * If no transaction failure, p_exit_cond will remain
 * unchanged as FALSE. Otherwise, p_exit_cond will
 /* reflect the re-calculated new exit condition.
 */
if (p_exit_cond is TRUE) { break; }                                 /* line 105 */
/* recompute "b" and "p" for the next round, here
 * we use p_lists[iter_number – 1] to reflect the fact
 * the value could be updated due to transaction failure.
 */
p = get_next (p_lists[iter_number – 1]);                            /* line 110 */
b = exit_condition (p);
}                                                                   /* line 112 */
```

Figure 4:
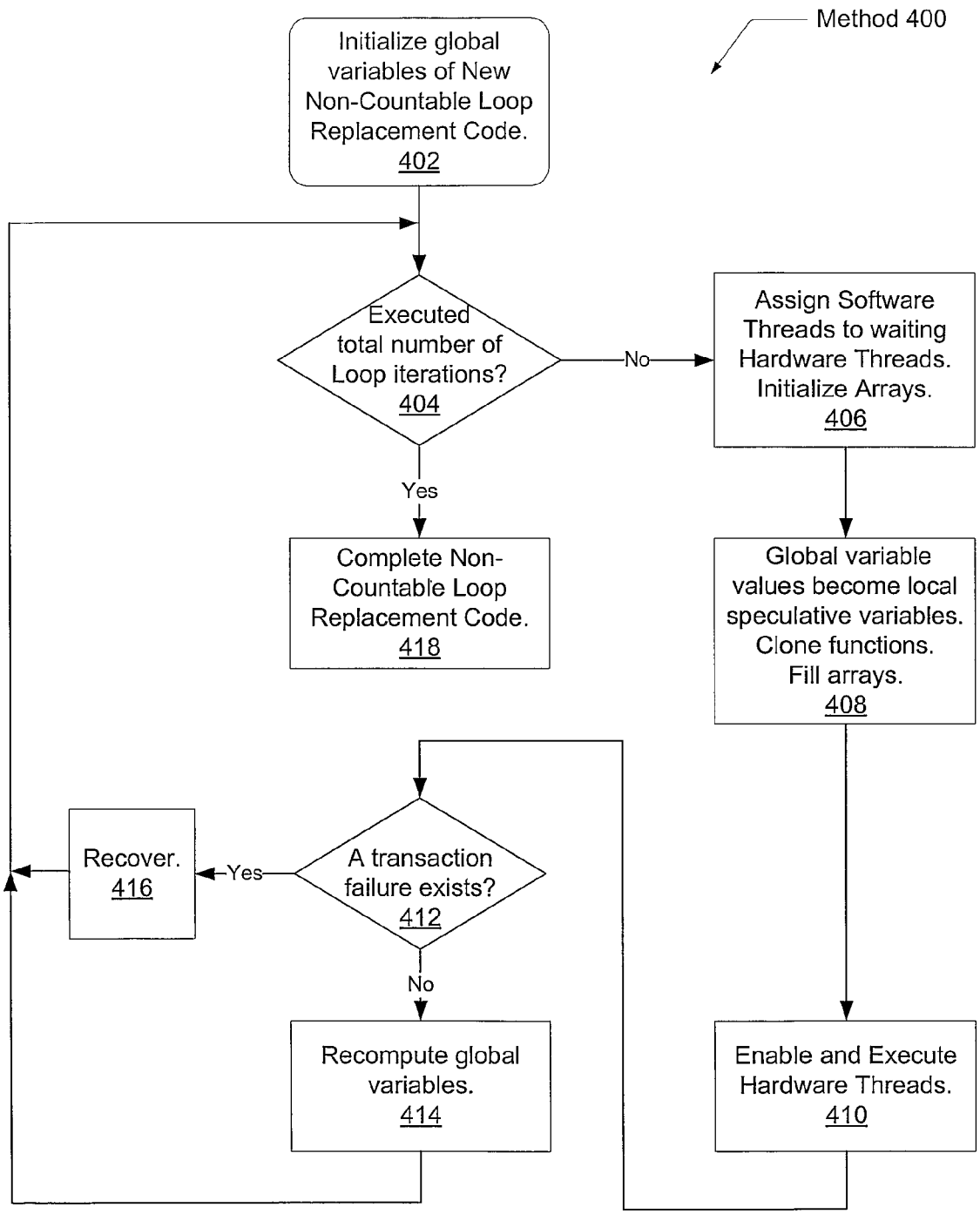
FIG. 4 is a flow diagram illustrating one embodiment of a method for execution of a compiled and parallelized non-countable loop.

A description of the above algorithm, which begins on line 60, and a method for the execution of the above algorithm follows. Referring now to FIG. 4, one embodiment of a method 400 for execution of a compiled and parallelized non-countable loop is shown. Method 400 may be modified by those skilled in the art in order to derive alternative embodiments. Also, the steps in this embodiment are shown in sequential order. However, some steps may occur in a different order than shown, some steps may be performed concurrently, some steps may be combined with other steps, and some steps may be absent in another embodiment. In the embodiment shown, all global variables are initialized in block 402. The initialization is shown in lines 60-61 above. The outer "while" loop at line 62 above begins the Master thread.

If the total number of loop iterations for the non-countable loop have not been executed (conditional block 404), then in block 406, a software Slave thread, wherein each software Slave thread represents one iteration of the non-countable loop, is assigned to a waiting hardware thread. In one embodiment, a waiting hardware thread may be an available processor core of a multi-core processor. Recall that the total number of loop iterations for the non-countable loop is not able to be determined beforehand. However, it is known during execution of the loop that the loop has not completed yet. The test condition in conditional block 404 may be defined in a function call, such as "exit_condition" on line 53 above regarding the non-countable loop pattern.

In one embodiment, each speculative and non-speculative Slave thread (i.e. the first Slave thread assigned to a waiting hardware thread) executes only one "do_work" function. In another embodiment, each speculative and non-speculative Slave thread may execute multiple "do_work" functions across a number of iterations. In the above example, only one "do_work" function is shown for illustrative purposes. Also, in the above example, the Slave threads are numbered starting from '0', but any starting value may be chosen. Since the first Slave thread assigned to a waiting hardware thread is non-speculative, in the above example, each non-speculative Slave thread is numbered '0'.

Lines 64-65 above initialize arrays. Global array "p_lists" records the value of the index variable "p" for each particular invocation of the "do_work" function. It also passes this information to the speculative Slave threads. This will be seen later in the above algorithm example. The pass-in value will be used for both the "do_work" function and transaction failure control.

In one embodiment, the compiler may collect the memory addresses which are accessed in the Main thread regarding the "exit_condition" and "get_next" functions. The Main thread does not collect the memory addresses accessed by the "do_work" function. The Main thread may pass these accessed addresses, before any "do_work" function executes, to each speculative Slave thread prior to the execution of any "do_work" functions. Before an executing speculative Slave thread (i.e. Slave thread[4]) performs a commit in order to signify successful completion of its respective transaction, it must wait until after its predecessor (i.e. Slave thread[3]) completes execution of its transactions and performs a successful check.

In this example, a successful check by Slave thread[3] signifies Slave thread[4] received a valid index value "p", and, therefore, Slave thread[4] will have successful computations in the transactions of its corresponding "do_work" function. However, the corresponding "do_work" function for Slave thread[4] may still erroneously modify memory locations used by the "get_next" and "exit_condition" functions. The speculative Slave thread (i.e. Slave thread[4]) will check the contents of these memory addresses and compare the content values stored to their corresponding previous content values prior to the "do_work" function. If any memory locations used by the "get_next" function is modified by the "do_work" function of Slave thread[4], then the "p" value used by Slave thread[5] may be incorrect. If any memory locations used by the "exit_condition" function is modified by the "do_work" function of Slave thread[4], then the exit condition value for Slave thread[5] may be incorrect. Therefore, any detected modifications require Slave thread[5] to be squashed and re-executed. Likewise, any currently executing Slave thread subsequent Slave thread[5] may be required to be squashed and re-executed. Slave thread[4] and prior currently executing Slave threads may be allowed to commit.

The global array "p_ld_lists" records all load operations in the functions "exit_condition" and "get_next". For example, for speculative Slave thread "slave_id", global array "p_ld_lists[slave_id]" will record all the load operations in the functions "exit_condition" and "get_next" which occur after the "do_work" function. With this information, it is possible to verify if the corresponding function "do_work" for speculative Slave thread "slave_id" modifies any memory location in global array "p_ld_lists[slave_id]". Should this occur, then subsequent functions "exit_condition" and "get_next" may receive different results and hence all subsequent speculative Slave threads need to be squashed and re-executed.

The inner "while" loop at line 66 above begins recording the information used by the slave threads both non-speculative (i.e. iteration number '0') and speculative. The "num_threads" variable is the number of waiting slave threads, which can be set by the user or can be set by the parallelization library at runtime. For example, the "num_threads" variable may be equal to the number of cores minus one in a multi-core processor. Remember, the Main thread will take one core to run. In block 408 of method 400, the respective index variable "p" is passed in on line 67 above. Notice that this value is speculative, and accordingly, the value may be incorrect. A later check will occur to determine whether or not a resulting transaction failure occurs due to an incorrect value. An incorrect value may only occur for speculative Slave threads. The non-speculative Slave thread (i.e. Slave thread '0') receives a correct value for the index variable "p". However, the subsequent speculative Slave threads may receive an incorrect value due to an erroneous load operation collision with their respective functions "do_work" and "get_next_clone", which is described next.

It is possible that the load operations in the "get_next" and "exit_condition" functions may generate a memory segmentation fault, which may not exist in the original application program. Therefore, these functions are cloned to form the new functions "get_next_clone" and "exit_condition_clone". All load operations in the new functions "get_next_clone" and "exit_condition_clone" are non-faulting load operations, which do not generate any segmentation fault at runtime. This changing of the load operations may be performed by opcode swapping.

The speculative local variables "p" and "b" are set by the new functions "get_next_clone" and "exit_condition_clone" in lines 87-88 above. The global array p_ld_lists[0:iter_number] is filled in the following line.

In block 410, the waiting hardware threads, such as cores on a multi-core processor, are enabled and permitted to execute. Lines 96 and 99 above correspond to these actions. The code to implement the waiting as the hardware threads complete the execution of the transactions may use the below functions. The original "while" loop may be used by the back-end compiler to generate the following two outline functions:

```
_outlined_$func1_ (pass_in_p,
int *addr_of_exit_cond) {                       /* line 113 */
    if (*addr_of_exit_cond is TRUE) {
        return 0;                               /* line 115 */
    }
    pass_in_p = get_next (pass_in_p);
    *addr_of_exit_cond = exit_condition (pass_in_p);
    return pass_in_p;
}                                               /* line 120 */
_outlined_$func2_ (pass_in_p,
int *addr_of_exit_cond) {                       /* line 121 */
    do_work (pass_in_p);
    if (break_condition (pass_in_p)) {
        *addr_of_exit_cond = TRUE;
        return;                                 /* line 125 */
    }
    return;
}                                               /* line 128 */
```

The outline function "_outlined_$func1_" calculates the subsequent value of the index variable "p" and the new exit condition. The updated value of "p" is returned. The outline function "_outlined_$func_2_" performs the "do_work" function based on the passed in value of "p" value. It also sets whether or not control should be transferred out of the loop body.

For each speculative Slave thread, the following common function "_slave_spec_" may be executed. The function "_slave_spec_" is part of the PL and it has the value "slave_id" as its input parameter. The below segments of the function "_slave_spec_" are only segments related to the parallelizing of non-countable loops. Segments not shown are similar to those segments concerned with parallelizing countable loops. A portion of the "_slave_spec_" function is shown below:

```
_slave_spec_ (slave_id) {                                   /* line 129 */
    BOOLEAN local_p_exit_cond;
Start:
    waiting for signals (slave_start[i]) to start;
    reset slave_start[i] to 0;
    local_p_exit_cond = p_exit_cond;
    checkpointing with FailPC if slave_id is not zero;      /* line 135 */
    _outlined_$func2_ (p_lists[slave_id].value_of_p,
                        &local_p_exit_cond);
    waiting for previous speculative thread is done;
    if(_self_fail_[slave_id] == 1) {
        Fail the current transaction;                       /* line 140 */
    }
    if (any content change in p_ld_lists[slave_id].load_addresses
        compared to the values saved in
        p_ld_lists[slave_id].load_values) {
        /* Signal to fail the subsequent speculative thread */
        _self_fail_[slave_id + 1] = 1;                      /* line 146 */
    }
    commit if the slave_id is not zero;
    /* update p_exit_cond only if successful commit */
    if (local_p_exit_cond is TRUE) {                        /* line 150 */
        p_exit_cond = TRUE;
    }
    set the current thread done;
    go to Start;
FailPC:                                                     /* line 155 */
    waiting for previous thread is done;
    reset the previous thread done flag;
    /* if needed, signal to fail the subsequent speculative thread */
    if (_self_fail_[slave_id] == 1) {
        _self_fail_[slave_id + 1] = 1;                      /* line 160 */
        _self_fail_[slave_id ] = 0;
    }
    /* re-calculate the pass-in "p" value. */
    local_p_exit_cond = p_exit_cond;
    new_pass_in_p =
        _outlined_$func1_ (p_lists[slave_id – 1].value_of_p,
                            &local_p_exit_cond);
    if (local_p_exit_cond is TRUE) {
        /* Only modify p_exit_cond if it is TRUE to avoid
          *unnecessarily store */
        p_exit_cond = TRUE;                                 /* line 170 */
        set the current thread done flag;
        go to Start;
    }
    /* update with the new value */
    p_lists[slave_id].value_of_p = new_pass_in_p;
    /* Directly update p_exit_cond if needed since
     * it is non-speculative */
    _outlined_$func2_ (new_pass_in_p, &p_exit_cond);
    set the current thread done flag;
    go to Start;
}
```

Once a hardware thread has completed the required execution of a transaction of its respective Slave thread in block 410, then a check is performed to determine if a transaction failure occurred (conditional block 412). Recall the first Slave thread ("slave_id" is '0') is non-speculative. The value this thread receives for the index variable "p" is non-speculative as shown in lines 60 and 67 in the above algorithm. However, in line 87, a speculative value for "p" is calculated by the function "get_next_clone" and this value will be passed to Slave thread[1] when line 67 is re-executed. Each subsequent Slave thread also receives a speculative value for "p" in a similar manner. Also, on line 89 in the above algorithm, the global array p_ld_lists stores the memory addresses and memory contents of each load operation corresponding to a particular Slave thread within both the "get_next" and "exit_condition" functions.

A load operation within the "get_next_clone" function, although non-faulting due to the swapping of opcodes, may collide with a store operation in the corresponding "do_work" function. Therefore, each speculative Slave thread may need to check whether or not the contents of the global array p_ld_lists[slave_id].load_addresses has changed between the start and the end of each of its respective "do_work" and "break_condition" functions. This check occurs in line 142 above.

If the contents do change (conditional block 412), then in block 416, recovery needs to occur. For example, if a multi-core processor has 6 waiting cores, or 6 hardware threads, in one embodiment, Slave thread[0] may be non-speculative and may successfully commit its results. Slave thread[1] may complete its respective transaction and the verification comparisons may show that there were no changes to accessed memory locations within the "get_next" and "exit_condition" functions. Therefore, Slave thread[1] may successfully commit its results.

Slave thread[2] will receive a valid "p" value, since the "get_next_clone" and "do_work" function of Slave thread[1] had no load/store operation collisions. However, a load/store operation collision may be determined for Slave thread[2] during the comparisons of values in array p_ld_lists[2].load_addresses. The comparisons may show one or more values of the contents in array p_ld_lists[2].load_addresses changed between the start and the end of its respective "do_work" and "break_condition" functions. Now Slave threads[3-5] need to be squashed and re-executed. In one embodiment, Slave threads[3-5] may be re-executed in a serial manner, wherein Slave thread[4] may not start until Slave thread[3] completes its transactions and commits its results. Alternatively, in another embodiment, a new set of 6 Slave threads may be started in parallel, such as Slave threads [3-8].

In the case where the contents in array p_ld_lists[slave_id].load_addresses changed between the start and the end of the respective "do_work" and "break_condition" functions, the subsequent speculative Slave threads will be signaled to fail as in line 146 above. During the FailPC segment shown on line 155 above, the updated index variable "p" value and exit condition will be computed before any work for the function "do_work" may be done.

A global array "_self_fail_" is introduced with an initial value of 0. Whenever the content of p_ld_lists[slave_id].load_addresses gets changed, the subsequent speculative thread should be squashed. To implement this, "_self_fail_[slave_id+1]" will be set to 1 as in line 146 above. For any slave thread, before commit, it will check whether its "_slave_fail_" value is 1, and if it is, this speculative Slave thread will fail itself and jump to FailPC as in lines 139 and 140.

After recovery in block 416, control in method 400 returns to conditional block 404. If a transaction failure does not occur in the currently executing speculative Slave threads (conditional block 412), then in block 414, the global variables "p" and "b" are computed for a possible next round of spawning speculative Slave threads as in lines 110-111 above. Following, control in method 400 returns to conditional block 404. If the total number of loop iterations for the non-countable loop have been executed (conditional block 404) as denoted by the variable "b" in lines 62 and 111 above, then the non-countable loop is completed (block 418). The resulting parallelization of the non-countable loop may improve performance of the multi-threading software application being compiled and executed on a multi-core processor or a multi-processor chip.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for parallelizing program code of an application, the method comprising:
    examining one or more program instructions of a multi-threaded application;
    identifying a non-countable loop pattern, wherein the non-countable loop includes a first function that uses a loop index variable as a parameter, wherein the first function performs input/output and modifies data, wherein identifying the non-countable loop pattern comprises determining whether the non-countable loop pattern meets a set of conditions including:
        a) an iteration count of the non-countable loop pattern cannot be determined by a compiler;
        b) an exit condition function of the non-countable loop pattern does not modify the loop index variable; and
        c) the first function that uses the loop index variable as a parameter does not modify the loop index variable;
    if the non-countable loop pattern is determined to meet the set of conditions, replacing the non-countable loop pattern with a parallelized loop pattern, wherein the parallelized loop pattern is configured to squash and re-execute any speculative thread of the parallelized loop pattern that is signaled to have a transaction failure; and
    if the non-countable loop pattern is determined to not meet the set of conditions, compiling the non-countable loop to execute in a serial manner.

2. The method as recited in claim 1, wherein said parallelized loop pattern is operable to:
    store one or more speculative values of a loop index of the parallelized loop pattern prior to the execution of any threads;
    store load operation addresses and corresponding load operation data values, prior to the execution of any threads; and
    signal a transaction failure of an immediate subsequent thread, in response to the load operation data values changing subsequent to execution of a current thread.

3. The method as recited in claim 2, wherein prior to the execution of any thread the speculative values include a non-speculative value of the loop index corresponding to an initial value defined in the multi-threaded application.

4. The method as recited in claim 2, wherein the load operation addresses correspond to load operations of qualified function calls receiving the loop index as an input, the qualified function calls comprising function calls defined in the non-countable loop pattern for determining an exit condition for the non-countable loop pattern.

5. The method as recited in claim 2, further comprising signaling a transaction failure of an immediate subsequent thread responsive to detecting a current thread is signaled for a transaction failure by a prior thread.

6. The method as recited in claim 5, wherein re-execution of threads with a transaction failure comprises:
    committing results of threads without a transaction failure;
    clearing the stored speculative values; and
    setting a value of the loop index of the parallelized loop pattern to a value of a loop index of a last thread without a transaction failure to commit its results.

7. The method as recited in claim 2, wherein the parallelized loop pattern replaces function calls in the non-countable loop pattern with outlined function calls to a parallelization library, wherein the outlined function calls comprise:

a first outlined function call configured to utilize function calls defined in the non-countable loop pattern for computing a loop index value for a subsequent iteration and an exit condition; and a second outlined function call configured to utilize function calls defined in the non-countable loop pattern for computing any break condition and performing the execution of a loop body of the non-countable loop pattern.

8. The method as recited in claim 2, further comprising setting a number of software threads to concurrently execute by a number of available hardware threads.

9. A system comprising:
one or more processors; and
memory storing program instructions that implement a compiler, wherein the compiler is executable by the one or more processors to:
examine one or more program instructions of a multi-threaded application;
identify a non-countable loop pattern, wherein the non-countable loop pattern includes a first function that uses a loop index variable as a parameter, wherein the first function performs input/output and modifies data, wherein identifying the non-countable loop pattern comprises determining whether the non-countable loop pattern meets a set of conditions including:
a) an iteration count of the non-countable loop pattern cannot be determined by the compiler;
b) an exit condition function of the non-countable loop pattern does not modify the loop index variable; and
c) the first function that uses the loop index variable as a parameter does not modify the loop index variable;
if the non-countable loop pattern is determined to meet the set of conditions, replace the non-countable loop pattern with a parallelized loop pattern, wherein the parallelized loop pattern is configured to squash and re-execute any speculative thread of the parallelized loop pattern that is signaled to have a transaction failure; and
if the non-countable loop pattern is determined to not meet the set of conditions, compile the non-countable loop to execute in a serial manner.

10. The system as recited in claim 9, wherein said parallelized loop pattern is operable to:
store one or more speculative values of a loop index of the parallelized loop pattern prior to the execution of any threads;
store load operation addresses and corresponding load operation data values, prior to the execution of any threads; and
signal a transaction failure of an immediate subsequent thread, in response to the load operation data values changing subsequent to execution of a current thread.

11. The system as recited in claim 10, wherein prior to the execution of any thread the speculative values include a non-speculative value of the loop index corresponding to an initial value defined in the multi-threaded application.

12. The system as recited in claim 10, wherein the load operation addresses correspond to load operations of qualified function calls receiving the loop index as an input, the qualified function calls comprising function calls defined in the non-countable loop pattern for determining an exit condition for the non-countable loop pattern.

13. The system as recited in claim 10, wherein the compiler is executable by the one or more processors to generate code operable to signal a transaction failure of an immediate subsequent thread in response to detecting a current thread is signaled for a transaction failure by a prior thread.

14. The system as recited in claim 13, wherein re-execution of threads with a transaction failure comprises:
committing results of threads without a transaction failure;
clearing the stored speculative values; and
setting a value of the loop index of the parallelized loop pattern to a value of a loop index of a last thread without a transaction failure to commit its results.

15. The system as recited in claim 10, wherein the parallelized loop pattern replaces function calls in the non-countable loop pattern with outlined function calls to a parallelization library, the outlined function calls comprising:
a first outlined function call configured to utilize function calls defined in the non-countable loop pattern for computing a loop index value for a subsequent iteration and an exit condition; and
a second outlined function call configured to utilize function calls defined in the non-countable loop pattern for computing any break condition and performing the execution of a loop body of the non-countable loop pattern.

16. A non-transitory computer readable storage medium storing program instructions that implement a compiler, wherein the compiler is executable by one or more processors to:
examine one or more program instructions of a multi-threaded application;
identify a non-countable loop pattern, wherein the non-countable loop pattern includes a first function that uses a loop index variable as a parameter, wherein the first function performs input/output and modifies data, wherein identifying the non-countable loop pattern comprises determining whether the non-countable loop pattern meets a set of conditions including:
a) an iteration count of the non-countable loop pattern cannot be determined by the compiler;
b) an exit condition function of the non-countable loop pattern does not modify the loop index variable; and
c) the first function that uses the loop index variable as a parameter does not modify the loop index variable;
if the non-countable loop pattern is determined to meet the set of conditions, replace the non-countable loop pattern with a parallelized loop pattern, wherein the parallelized loop pattern is configured to squash and re-execute any speculative thread of the parallelized loop pattern that is signaled to have a transaction failure; and
if the non-countable loop pattern is determined to not meet the set of conditions, compiling the non-countable loop to execute in a serial manner.

17. The storage medium as recited in claim 16, wherein said parallelized loop pattern is operable to:
store one or more speculative values of a loop index of the parallelized loop pattern prior to the execution of any threads;
store load operation addresses and corresponding load operation data values, prior to the execution of any threads; and
signal a transaction failure of an immediate subsequent thread, in response to the load operation data values changing subsequent to execution of a current thread.

18. The storage medium as recited in claim 17, wherein prior to the execution of any thread the speculative values include a non-speculative value of the loop index corresponding to an initial value defined in the multi-threaded application.

19. The storage medium as recited in claim 17, wherein the load operation addresses correspond to load operations of qualified function calls receiving the loop index as an input, the qualified function calls comprising function calls defined in the non-countable loop pattern for determining an exit condition for the non-countable loop pattern.

20. The storage medium as recited in claim 17, further comprising signaling a transaction failure of an immediate subsequent thread responsive to detecting a current thread is signaled for a transaction failure by a prior thread.

21. The storage medium as recited in claim 20, wherein re-execution of threads with a transaction failure comprises:
committing results of threads without a transaction failure;
clearing the stored speculative values; and
setting a value of the loop index of the parallelized loop pattern to a value of a loop index of a last thread without a transaction failure to commit its results.

22. The storage medium as recited in claim 17, wherein the parallelized loop pattern replaces function calls in the non-countable loop pattern with outlined function calls to a parallelization library, wherein the outlined function calls comprise:
a first outlined function call configured to utilize function calls defined in the non- countable loop pattern for computing a loop index value for a subsequent iteration and an exit condition; and
a second outlined function call configured to utilize function calls defined in the non-countable loop pattern for computing any break condition and performing the execution of a loop body of the non-countable loop pattern.

23. The storage medium as recited in claim 17, wherein the compiler is executable by one or more processors to generate instructions to set a number of software threads to concurrently execute by a number of available hardware threads.

* * * * *